US006926202B2

United States Patent
Noonan

(10) Patent No.: US 6,926,202 B2
(45) Date of Patent: Aug. 9, 2005

(54) SYSTEM AND METHOD OF DETERRING THEFT OF CONSUMERS USING PORTABLE PERSONAL SHOPPING SOLUTIONS IN A RETAIL ENVIRONMENT

(75) Inventor: William Noonan, Cavy, NC (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 10/624,324

(22) Filed: Jul. 22, 2003

(65) Prior Publication Data
US 2005/0017071 A1 Jan. 27, 2005

(51) Int. Cl.$^7$ ............................................. G06F 17/60
(52) U.S. Cl. ......................................... 235/385; 705/16
(58) Field of Search ................................ 235/383, 385; 186/56–59; 705/16–25, 28

(56) References Cited

U.S. PATENT DOCUMENTS 6,607,125 B1 * 8/2003 Clouser et al. ............. 235/383
6,619,546 B1 * 9/2003 Nguyen et al. ............. 235/383

* cited by examiner

Primary Examiner—Diane I. Lee
Assistant Examiner—Jamara A. Franklin
(74) Attorney, Agent, or Firm—Jeanine S. Ray-Yarletts

(57) ABSTRACT

A method to use electronic tags in stores in conjunction with portable shopping devices by providing a means for deactivating an active electronic tag of a product to be purchased while permitting a consumer to purchase and transact using a portable shopper, while deterring the opportunity for shrinkage by theft associated with the use of portable shopping devices is provided.

20 Claims, 2 Drawing Sheets

SYSTEM AND METHOD OF DETERRING THEFT OF CONSUMERS USING PORTABLE PERSONAL SHOPPING SOLUTIONS IN A RETAIL ENVIRONMENT

BACKGROUND OF THE INVENTION

1. Field of the Invention

The present invention relates generally to retailing devices and apparatuses therein, and, more particularly, to methods of deterring theft involving portable personal shopping devices used by consumers as they shop.

2. Description of Related Art

It is known that in retailing, portable shopper devices and applications are an emerging and popular technology. Portable shopper devices (also known as portable shoppers) use wireless technology, touch screen displays, include computer processing capabilities, and may also include scanning devices suited to scan labels of items offered for sale. These portable shoppers are generally situated and arranged on mobile equipment (such as carts or in a hand-held form) so as to permit consumers the ability to scan their selected items as they shop while providing those consumers the ability to thereafter complete the transaction by quickly proceeding through the checkout lane. Certain portable shoppers provide consumers the ability to also checkout from their devices by further including a swipe type of device (such as a magnetic card stripe reader (MSR) suited for a credit card).

In many cases, retailers are also including upgraded software applications (e.g., shopping list, deli ordering, product information, product locator) which provide consumers further options while shopping. While consumers are finding these portable shoppers to be convenient in use, retailers are realizing that consumers may elect to shop at a particular grocer due to this convenience and the shortened time in which the consumer may encounter throughout the entire collection and checkout process takes. This latter aspect is particularly enticing to consumers and retailers alike, as in the checkout lane there is no need to re-scan the collected items in the cart as the items in the cart have already been scanned by the consumer prior to placement in the cart.

As becomes obvious, the retailer directly benefits from this time saving feature as the retailer realizes reduced labor costs due to the expedited checkout process and can consider further advertisement or incentivized communication with the consumer during the collection portion of the consumer's time spent shopping.

However these portable shoppers, though convenient and economically well-suited, pose retailers with a significant concern—that of theft, both of products to be purchased as well as the device itself. In general, since the consumer is essentially performing the process of scanning products of interest prior to the checkout phase, retailers have expressed concerns that a consumer who uses a portable shopper may either accidentally or purposefully not scan all items which are intended for acquisition by the consumer.

It is known to attempt to make certain attempts to overcome this possibility of theft (also known as "shrinkage") by initiating random re-scanning of consumers' carts of products, adding additional surveillance equipment and even hiring additional security personnel.

For instance, in the former scenario, the random re-scanning approach randomly identifies consumers who use the portable shopping solution such that when an identified consumer using a portable shopper approaches, certain members of the retailing staff are "informed" that a re-scan of the identified customer's cart will occur. Once the identified customer reaches the checkout area, a traditional checkout procedure is initiated where the retailing staff re-scans each item in the consumer's cart. During re-scanning, if a discrepancy is found, the customer-determined balance (the total amount due as determined by the consumer when using the portable shopper) is adjusted upwards or downwards. However, even where a discrepancy is found, typically a retailer does not take steps to seek punitive action against the consumer, primarily as the retailer realizes the error could be the result of but an honest mistake by the consumer. Certain retailers, however, may elect to electronically note the incident in association with the identified consumer and identify the consumer as being a "risk" in their electronic database, such that when that consumer uses a portable shopper in the future there is a strong likelihood that the consumer would be more likely to be re-scanned again.

While this solution serves mainly to randomly attempt to mitigate theft, this approach is not preferred by retailers as it is an inconvenience in time and patience for their consumers, it may also serve to accidentally embarrass loyal and honest consumers who make a scanning mistake, it can be used to wrongfully identify consumers as being high risk while others who are engaging in theft are not identified, and it fails to set an effective deterrent to would-be criminals and thereby fails to assist in controlling the problem of "shrinkage".

It is also known to employ a video surveillance system in conjunction with targeted re-scans as another approach. To implement this approach, a system uses video cameras throughout the store to monitor consumers who use the personal shopping devices. These surveillance systems allow the retailing staff to monitor both the consumer and the data on their personal shopping device, concurrently or separately. In practice, if a member of the retailing staff were to observe a consumer place an item into the shopping cart, but were not to observe the consumer scanning the item, the staff may review the data from the consumer's cart to confirm that the item was not scanned; where this observation and corroborating information were to be identified by the retailing staff, then the staff could identify that consumer for re-scanning at the checkout via the approach first mentioned above. Unfortunately, though this approach may be better suited to catch would-be criminals than the random re-scanning approach, this process requires more equipment than the re-scanning approach and hence a large investment on the part of the retailer. This solution also requires the retailer to assign a dedicated staff to monitor the consumers and also to deploy dedicated staff on the floor to engage would-be criminals in the act.

It is also known to utilize Radio Frequency Identification (RFID) tags in a retailing environment. An RFID system includes the use of a simple, electronic tag attached on a product item that emits a signal so as to be detected by a sensing device when the RFID tag passes a sensor strategically placed in the retailer's store. Although these tags are not yet cost-effective, retailers are hopeful that this technology may eventually replace barcode labels of products such that RFID tags of each product will emit their own individual signals at checkout such that the contents of an entire shopping basket could be scanned all at once. However, at present these devices add a substantial economic burden to the retailer both with the additional of the RFID tags and the large, mandatory sensor equipment. Additionally, items of higher value are typically not well-configured to accept an RFID tag and it is relatively easy for a consumer, unseen, to switch RFID tags of one product with those of a lesser priced product.

It is also known to implement an approach that uses Electronic Article Surveillance (EAS) tags on higher-priced items in the store. These EAS tags are an improvement over RFID tags for the higher-priced items as they possess the following characteristics: they are hard to remove or detect by the consumer, they can be deactivated by the Point of Sale (POS) systems during the checkout process, and, when active, they can set off an alarm as the consumer leaves the store. Though these EAS-based systems have proven assistive in a traditional checkout environment, since they also possess the required characteristic that each tag must be deactivated, the use of an EAS system with a portable shopper has heretofore not been considered for or demonstrated to be a workable solution.

SUMMARY OF THE INVENTION

Thus, the need persists for a method that deters theft of a consumer using a portable shopper device that overcomes these unresolved problems and deficiencies and sets forth additional advantageous attributes as further detailed by the invention in the manner described hereinbelow.

The present invention sets forth a method to use electronic tags on products in stores (retail environments) in conjunction with portable shopping devices by providing a means for deactivating an active electronic tag of a product to be purchased while permitting a consumer to freely purchase and transact using a portable shopper, while deterring the opportunity for shrinkage by theft associated with the use of portable shopping devices.

In accordance with a preferred aspect, the method of the present invention comprises the steps of scanning one or more products selected by consumer for purchase for a transaction in a retail environment via a scanning device operated by said consumer, communicating scanned information from said scanned one or more products with a database having product identification information associated with said scanned information in relation to each of said one or more scanned products, receiving said product identification information from said communication to said consumer via a notification means identifying a scanned product comprising an electronic tag which emits an electronic signal when activated, wherein said notification means informs said consumer to place said scanned product comprising an electronic tag into a predetermined location within said cart, placing each identified scanned product comprising an electronic tag at a deactivation point, and deactivating each identified scanned product comprising an electronic tag, monitoring said consumer following completion of said transaction for alarm notification of a product comprising an activated electronic tag.

In accordance with another preferred embodiment, the present invention comprises a system for deterring theft in a retail environment having a retail system having at least one checkout station and a POS consisting of a scanner and a terminal comprising a till, a display, a printer, a card reader, an alarm notification means, and electronic tag deactivation sensor, a portable shopper device comprising a processor, a display, a scanner and a memory, operable by a consumer, a cart having a main area and a predetermined area for scanned products having an electronic tag, and a database capable of electronic communication with said POS and said shopper device, containing product identification information for at least one scanned product, wherein scanned product information obtained from said scanner of said shopper device is electronically transmitted to said database and a response from said database is electronically transmitted to said shopper device for display, and a directive response is displayed to said consumer in relation to a presence of an electronic tag on said scanned product as determined from said product identification information so as to direct consumer to place said scanned product at a predetermined location in said cart of consumer

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
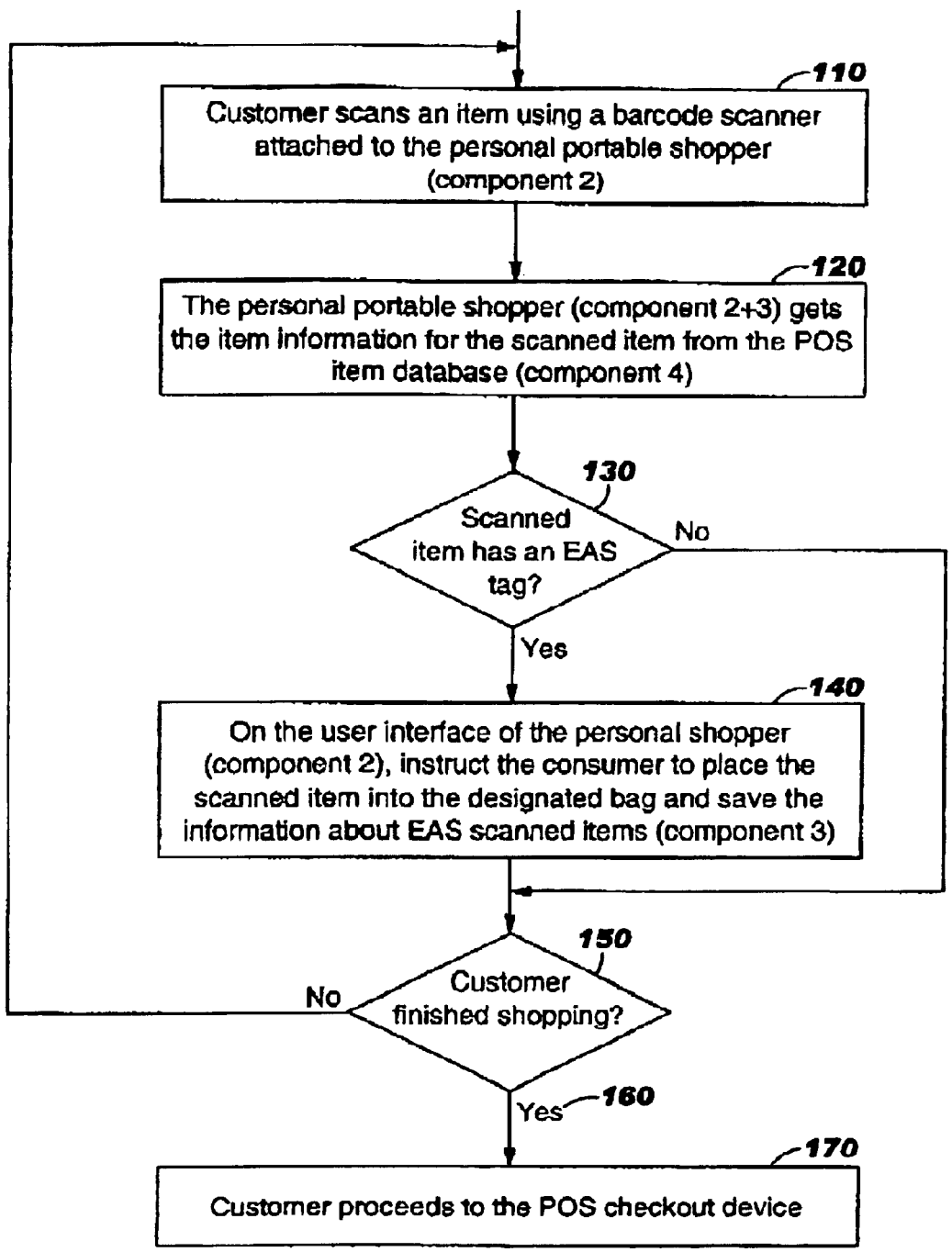
FIG. 1 is a flowchart of a preferred method leading up to the point of checkout in accordance with an embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

A retail system as used herein typically comprises checkout stations (also used as point of sale devices (POS)), each consisting of a scanner and a terminal comprising till (cash register), display, printer, card reader, and electronic tag deactivation sensor. The scanner operates by detecting conventional bar codes, printed on purchased items, and passes these to a main server computer across the retailer's network which is in communication with a database storing bar codes, prices and product names. The database also stores, via table or relational association, which products are designated as having an electronic tag. Prices, electronic tags and product names corresponding to the bar codes are identified and fed back to the terminal for display to the checkout operator and customer when these products undergo a formal checkout process. The server, or possibly, the terminal itself lists all the items purchased and calculates the total price to be paid. The printer of the POS typically prints the till receipt for the customer in conventional manner.

A portable shopper device comprises computer-based processing means, a display, a scanner and a memory. Preferably, the device also comprises an activation trigger and a keypad, though such are not necessary. In a preferred embodiment, the activation means may be a swipe card mag strip or similar so a consumer may activate a hand held portable shopper device by swiping their loyalty card and thereby activating the device while communicating their presence with the retail system server. One aspect of this system is the maintenance and updating of a "customer shopping profile" in a memory of the hand-held device. A "purchase record" containing item names, quantities and numeric codes may be built up during shopping and used to facilitate checkout and also as a basis for updating the contents of the profile memory. Before shopping, optionally, the customer uses the customer profile and other information, say about discounts, to create a shopping list which is then stored in the shopper device and which interacts with the retailer's central computer to signal that the customer is near an item on the list by causing a light on a product price display to blink or a notification means on the hand held device to activate. In yet another aspect of the present invention, product information may be stored locally in the memory of the device.

In one aspect of the present invention, electronic tags may be affixed to certain products by the retailer, or by the manufacturer. In a preferred aspect, a retailer may elect to affix electronic tags to both products having high value and products having low value, wherein said tags are hidden from a purchasing consumer's view.

In a preferred aspect, the present invention provides a system having a personal portable shopping device that allows consumers to shop and scan items as they walk through the store, whereby consumers may maintain a list of all items scanned by the consumer via their shopping device.

FIG. 1 is a flowchart of a preferred method leading up to the point of checkout in accordance with an embodiment of the present invention. In practice, a consumer may use the portable shopper device of the present invention to collect items desired for purchase, scan those items (110), and then place those items in the cart in anticipation of checkout, where at the time of scanning by the consumer, the portable shopper is in communication with the retail system database to identify the product being scanned (120), identify if the scanned item has an electronic tag (130), instruct the consumer where to place an item having an electronic tag (140), assess whether the consumer if completed shopping and scanning (150), and if so (160), then update the transaction information in relation to the consumer's selected product choices as the consumer proceeds to final check out at a point of sale (POS) check out lane (170).

Figure 2:
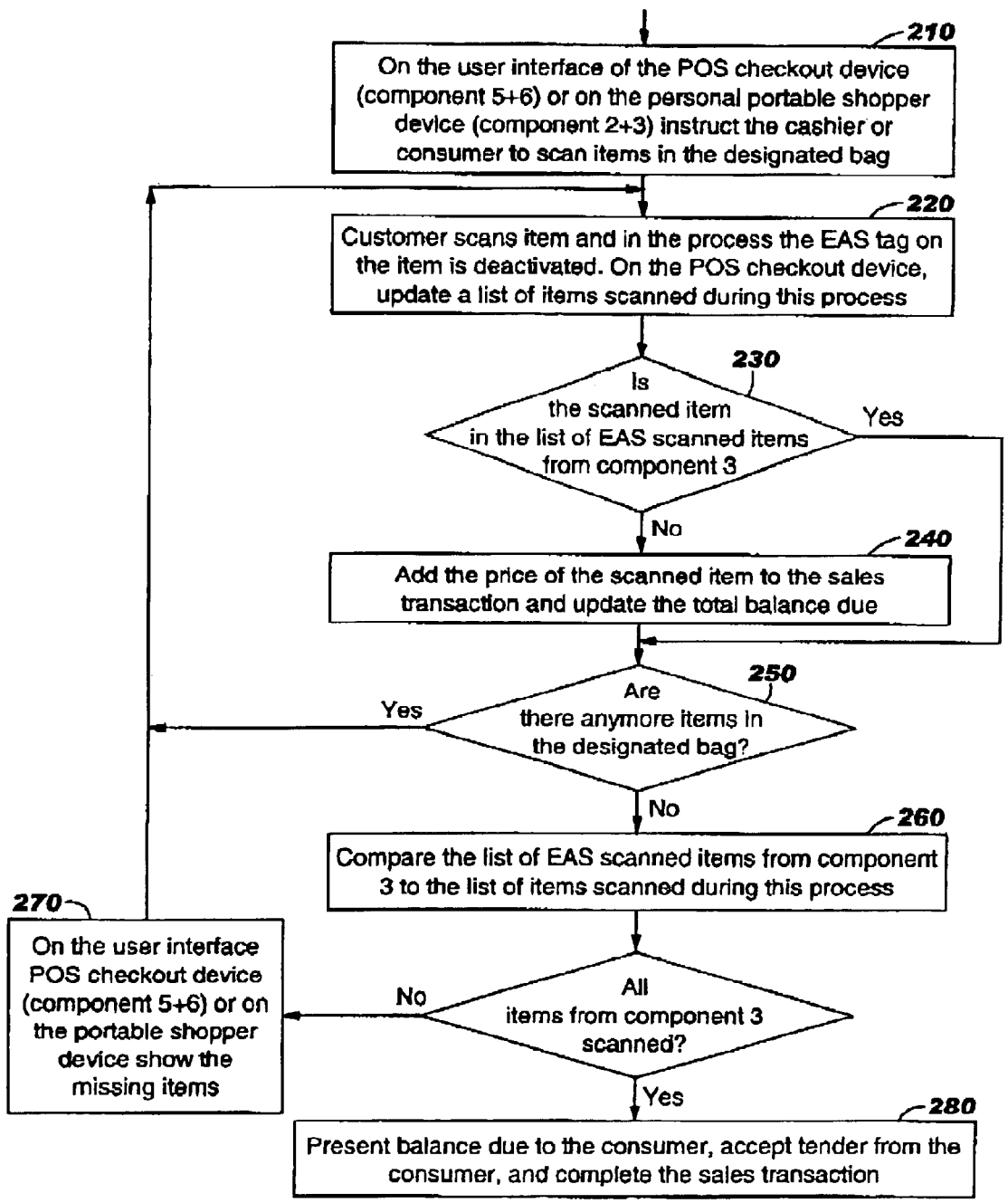
FIG. 2 is a flowchart of a preferred method following at the point of checkout in accordance with an embodiment of the present invention.

FIG. 2 is a flowchart of a preferred method following at the point of checkout in accordance with an embodiment of the present invention. Once at final check out, the consumer (or the cashier if checkout is an assisted checkout lane) is instructed what items to place for scanning and/or deactivation (210). Once identified, the consumer (or cashier) places those items for scanning and/or deactivation (220). If the scanned item has already been scanned, no adjustment will be made to the running total of the consumer and the product will only be deactivated (230); if however, the item is not found in the running total of the consumer, the item will be added to the running total and the item will then be deactivated (240). An assessment of whether there remain additional items to be scanned and/or deactivated is made (250) and those items then also undergo the same process. Once all items are indicated as being scanned by the consumer (or cashier) then the scanned items are compared with the expected items to be scanned (260). In the event there remains additional items required to be scanned, as determined by the shopper device in communication with the checkout, a request for these items will be made to the consumer (or cashier) (270). When all items identified as needing scanning are scanned and/or deactivated, then the running total of the consumer is determined to a final total, and the transaction is completed by the consumer finalizing the purchase (280).

Commensurate with the scanning by the consumer of any item selected via the present invention, the retail database return purchase information for display to the consumer about the product. Additionally, the retail database also returns further communication to the consumer via the portable shopper, either via the display on the device or via an audio emission from the device, so as to indicate to the consumer that the item scanned is a specially-tagged item that requires unique handling. The database is aware that the scanned item is or is not a specially-tagged item due to the relational database associated with the scannable label of the product. An item identified to the consumer as requiring special handling is indicative that the scanned item contains an electronic tag which may not necessarily be visible to the consumer. Upon communication to the consumer, the consumer understands that the specially-tagged item is to be placed in a predetermined location within the consumer's cart. In a preferred embodiment, the predetermined location within the consumer's cart may be a specially colored shopping bag, a segregated collection area, or any other aspect which serves to set aside a separate area of the cart for collection of products containing electronic tags. Again, although the consumer may not necessarily realize the product scanned contains an electronic tag, the consumer remains aware that the scanned item requires special treatment by the consumer.

Following receipt of notification of special treatment by the consumer, the consumer then preferably places the specially-tagged product in the predetermined area of the cart and continues with their shopping plans. Once the consumer elects to complete their shopping experience, they may proceed to an area of the retailer traditional set up for checkout. However, as the shopper has used a portable personal shopper device, there is preferably no need for traditional checkout, but rather the consumer is ideally situated for an accelerated checkout where only those items identified as being specially-tagged need to undergo review by retail checkout staff.

In one embodiment of the present invention, upon arrival to the final checkout area, a consumer using the portable shopper identifies to the retail staff present the items that have been designated as being specially-tagged. The retail staff then compares the items sought to be scanned and deactivated with the items present in the consumer's special area of the cart. The retail staff then removes each item that is identified as being specially-tagged scans the item and passes the item across a deactivation sensor, and preferably returns the now deactivated specially-tagged item into the consumer's cart without regard to a separate predetermined location within the cart.

In another embodiment of the present invention, upon arrival to the final checkout area, a consumer using the portable shopper removes each item that has been identified as being specially-tagged and positioned within the segregated location in the cart, and scans each item and passes each item across a deactivation sensor, and then preferably returns the now deactivated specially-tagged item into the segregated area of the consumer's cart (for improved surveillance), although the final location of these items in the cart is not required to be in any particular arrangement. In both embodiments, following this deactivation step, the transaction of the consumer is consummated where adjustments to specially-tagged items placed in the segregated area but not scanned are corrected, and the consumer pays their bill in their preferred method. Thereafter, in both embodiments, a consumer then proceeds toward the exit with their purchased products and passes through a final sensor that checks for electronic tags that remain active.

As the consumer passes through the final sensor, if there is an electronic tag that is active, the alarm will sound. A retail staff member may then approach the consumer and ask to see the receipt, review the items in the cart, and identify if there are any items that (1) are in the cart and have been purchased but not deactivated, (2) have been placed in the cart but were scanned or deactivated, or (3) remain activated but do not appear in the cart. Accordingly, the retail staff member may take the appropriate action with the consumer to deactivate an identified item, correct an error, or seek a means to assess criminal activity As will be apparent to others, the location of the final sensor may be one and the same as the sensor used in the final checkout stage as well.

In this manner, the present invention does not add a burdensome review period to a consumer, does not require additional staffing by the retailer beyond that already used, and likely identifies those who have attempted to by-pass the electronic tag system by hiding the item or placing it in plain view.

It is also envisioned that the present invention could be used to create a random application of electronic tag assignments where products that are not necessarily only the high-valued or high-priced items would also carry an electronic tag and be identified via a database to be inclusive of the tag. In this manner, as shrinkage is not always due to theft of the highest priced items, interim checks and random tests could be conducted within a retail environment to assess what products were likely susceptible to theft or to assess if theft was occurring within the store, by consumers or by store personnel.

While the exemplary embodiments of the present invention have been described with respect to processes of circuits, the present invention is not so limited. As would be apparent to one skilled in the art, various software program steps could also be implemented as functions of circuit elements or in a non-software oriented manner. It is also possible to implement these steps in a variety of ways such as via software, applications, digital communication devices, signal processors, micro-controllers or general-purpose computers.

Although an embodiment of the present invention is described above, the present invention is not limited to the above embodiment, and it is understood by those skilled in the art that other configuration(s) in view of the invention are also possible. In general, the present invention may be implemented for retailers, grocers, and even discount centers having products that are identifiable by a scannable label, however, the present invention is not intended to be limited to only these implementations.

The use of the term EAS tag is intended to be a preferred embodiment of the present invention, but the underlying invention is not limited solely to the use of an EAS tag, as any electronic tag will suffice.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for deterring theft in a retail environment comprising the steps of:
   scanning one or more products selected by consumer for purchase for a transaction in a retail environment via a consumer operable scanning device,
   communicating scanned information from said scanned one or more products with a database having product identification information associated with said scanned information in relation to each of said one or more scanned products,
   receiving said product identification information from said communication to said consumer via a notification means identifying a scanned product comprising an electronic tag which emits an electronic signal when activated, wherein said notification means informs said consumer to place said scanned product comprising an electronic tag into a predetermined location within said cart,
   placing each identified scanned product comprising an electronic tag at a deactivation point, and
   scanning each identified scanned product comprising an electronic tag,
   assessing whether each scanned product comprising an electronic tag was scanned by consumer via said scanning device,
   deactivating each activated electronic tag of each identified scanned product comprising an electronic tag,
   updating said transaction to calculate a total purchase amount, and
   monitoring said consumer following completion of said transaction for alarm notification of a product comprising an activated electronic tag.

2. The method of claim 1 wherein one or more products comprises an electronic tag that is fixedly secured to said one or more products.

3. The method of claim 2 wherein said one or more products includes an electronic tag that is fixedly secured to said one or more by products by a retailer.

4. The method of claim 2 wherein said one or more tagged products includes an electronic tag that is fixedly secured to said one or more tagged by products by a manufacturer of one of said one or more tagged products.

5. The method of claim 2 wherein said an electronic tag is an Electronic Article Surveillance (EAS) tag.

6. The method of claim 2 wherein said electronic tag is deactivated upon application to said one or more tagged products and may be activated at said retail environment.

7. The method of claim 1, further comprising the step of signaling an alarm to indicate said consumer possesses at least one product having an active electronic tag.

8. The method of claim 1, further comprising directing the consumer to place products having an electronic at a predetermined location at checkout.

9. The method of claim 1, further comprising the step of instructing said consumer to place scanned and deactivated products at a predetermined location in said cart.

10. The method of claim 1, comprising the steps of:
    calculating a rolling transaction total during consumer's shopping wherein each item scanned by consumer is added to said rolling total displayed to consumer, comparing identified scanned products comprising an electronic tag with said scanned one or more products and adjusting said rolling transaction total in response thereto, and signaling an alarm in an event that said consumer possesses at least one product having an active electronic tag that was not deactivated in the deactivation step.

11. The method of claim 1, wherein said notification means is a personal display visible to said consumer.

12. The method of claim 1, wherein said scanning device is a portable personal shopper device.

13. The method of claim 12, wherein said personal shopper device comprises a processor, a memory, a display, and an electronic communication means for communication with said server wherein said device is affixed to said cart.

14. The method of claim 12, wherein said personal shopper device comprises a processor, a memory, a display, and product identification information resident in said memory.

15. A system for deterring theft in a retail environment comprising:

a retail system having at least one checkout station and a POS consisting of a scanner and a terminal comprising a till, a display, a printer, a card reader, an alarm notification means, and electronic tag deactivation sensor, a portable shopper device comprising a processor, a display, a scanner and a memory, operable by a consumer, a cart having a main area and a predetermined area for scanned products having an electronic tag, and a database which electronically communicates with said POS and said shopper device, containing product identification information for at least one scanned product, wherein scanned product information obtained from said scanner of said shopper device is electronically transmitted to said database and a response from said database is electronically transmitted to said shopper device for display, and a directive response is displayed in relation to a presence of an electronic tag on said scanned product as determined from said product identification information from said database so as to direct placement of said scanned product at a predetermined location in said cart, and wherein said POS compares a first list of product having an electronic tag with product presented at checkout for scanning and deactivation, and generates a second list identifying product not presented for scanning and deactivation at checkout.

16. The system of claim 15, wherein said database is resident in said memory of said shopper device.

17. The system of claim 16, wherein said shopper device is a portable device having a display viewable by said consumer.

18. The system of claim 16, wherein said shopper device further calculates a running total of each scanned product scanned by a consumer.

19. The system of claim 16, wherein said alarm notification means transmits an audible signal upon a detection of one or more products having an activated electronic tag that was not deactivated by said deactivation sensor.

20. A system for deterring theft in a retail environment comprising:

a retail system having two or more checkout stations, each station comprising a POS having a scanning means, a display, a printer, a card reader, an alarm notification means, and electronic tag deactivation means, a portable shopper device comprising a processor, a wireless communication means, a display, a scanner and a memory a cart having a main area and a predetermined area for scanned products having an electronic tag, and a database which electronically communicates with said POS and said shopper device, containing product identification information for at least one scanned product, wherein said system is operable to scan one or more products selected by consumer for purchase for a transaction in a retail environment via a scanning device operable by said consumer, communicate scanned information from said scanned one or more products with a database having product identification information associated with said scanned information in relation to each of said one or more scanned products, receive said product identification information from said communication to said consumer via a notification means identifying a scanned product comprising as electronic tag which emits an electronic signal when activated, wherein said notification means informs said consumer to place said scanned product comprising an electronic tag into a predetermined location within said cart, place each identified scanned product comprising an electronic tag at a deactivation point, and scan at a checkout station each identified scanned product comprising an electronic tag, determine whether each scanned product comprising an electronic tag was previously scanned by said scanning device, deactivate each activated electronic tag of each identified scanned product comprising an electronic tag, update said transaction to calculate a total purchase amount, and monitor said consumer following completion of said transaction for alarm notification of a product comprising an activated electronic tag.

* * * * *